United States Patent [19]

Young et al.

[11] 3,919,349

[45] Nov. 11, 1975

[54] REMOVAL OF UNREACTED ACID FROM POLYTHYLENIC POLYESTERS

[75] Inventors: Richard A. Young, Buffalo Grove; William J. Radak, Mount Prospect, both of Ill.

[73] Assignee: De Soto, Inc., Des Plaines, Ill.

[22] Filed: Sept. 20, 1974

[21] Appl. No.: 507,902

[52] U.S. Cl............................ 260/837 R; 260/836
[51] Int. Cl.².......................................... C08L 63/00
[58] Field of Search............................ 260/836, 837

[56] References Cited
UNITED STATES PATENTS

| | | | |
|---|---|---|---|
| 3,256,226 | 6/1966 | Fekete | 260/23.5 |
| 3,301,743 | 1/1967 | Fekete | 161/194 |
| 3,373,075 | 3/1968 | Fekete | 161/185 |
| 3,377,406 | 4/1968 | Newey | 260/837 |
| 3,432,478 | 3/1969 | May | 260/78.5 |
| 3,551,235 | 12/1970 | Bassemir | 260/836 |
| 3,551,311 | 12/1970 | Nass | 204/159.18 |
| 3,793,398 | 2/1974 | Hokamura | 260/835 |
| 3,808,114 | 4/1974 | Tsuchihara | 260/836 |

*Primary Examiner*—Paul Lieberman
*Attorney, Agent, or Firm*—Dressler, Goldsmith, Clement & Gordon, Ltd.

[57] ABSTRACT

The direct esterification of polyhydric alcohols with monoethylenic monocarboxylic acids such as acrylic acid to produce polyethylenic polyesters normally results in the presence of unreacted acid which, in accordance with the invention, is rendered innocuous by reaction with expoxide. The resulting epoxy ester is not detrimental, and it may be selected to desirably modify the properties of the polyethylenic polyester.

12 Claims, No Drawings

REMOVAL OF UNREACTED ACID FROM POLYTHYLENIC POLYESTERS

The present invention relates to the direct esterification of polyhydric alcohols with polymerizable monoethylenically unsaturated monocarboxylic acids in order to form polyethylenic polyesters.

This esterification reaction is difficult because of the danger of undesired polymerization. The more complete the esterification of the available hydroxy groups or the more complete the consumption of the available carboxylic acid groups, the greater the difficulty. Not only is there a danger of gelation, but the effort to completely consume the carboxylic acid leads to discoloration even when gelation is avoided, and a discolored or darkened polyester product is also undesirable. As a result, the esterification reaction is normally carried out with an excess of unsaturated acid over that which it is desired to incorporate and the reaction is terminated short of completion, leaving unreacted unsaturated acid which must be removed.

The removal of this unreacted acid is a problem since the available techniques, such as washing, distilling, precipitating, and the like, add to the cost of production and lead to economic loss since the unconsumed acid is not easily recovered for reuse. Even when one ignores recycling, there is still a disposal problem.

This invention is concerned with avoiding the need to remove the unreacted unsaturated acid by converting it into a form which is compatible with the polyethylenic polyester which is the prime product of reaction, namely, by converting it into another polyethylenic polyester by reaction with an added epoxide.

In preferred practice, the epoxide addition is selected so as to desirably modify the prime product of reaction, e.g., by changing (usually lowering) its viscosity, or by adjusting final desired properties, such as flexibility or hardness. In this regard, it will be appreciated that the polyethylenic polyesters are ultimately polymerized and the final properties noted are those obtained by polymerization, in this case copolymerization with the epoxide acrylate.

Any esterifiable aliphatic polyhydric alcohol may be used in this invention, and any polymerizable monoethylenic carboxylic acid can be used for the direct esterification. Similarly, any direct esterification process may be employed. This is because this invention is only concerned with how to handle the unreacted acid which appears in the final product in admixture with the polyethylenic polyester which has been produced.

With the above in mind, the aliphatic polyhydric alcohols which may be esterified in accordance with this invention are illustrated by ethylene glycol, propylene glycol, glycerin, trimethylol propane, pentaerythritol, mannitol, glucose, polyethers provided by adducting an alkylene oxide, such as ethylene oxide or propylene oxide with polyhydric alcohols as noted above, polyesters provided by adducting lactones, such as epsilon caprolactone, with polyhydric alcohols as noted above, etc.

It is particularly preferred to employ aliphatic polyhydric alcohols having a molecular weight below 4000, and which contain 3 or 4 hydroxy groups per molecule, and to react these so as to incorporate in excess of 2 moles of carboxylic acid per mole of polyhydric alcohol. Especially preferred are glycerin, trimethylol propane and pentaerythritol, and the production of polyacrylates is of especial importance.

The polymerizable ethylenically unsaturated carboxylic acids are monoethylenic and monocarboxylic and the unsaturation is preferably alpha, beta as in acrylic acid, methacrylic acid, crotonic acid, monobutyl fumarate, and the like. The more easily the acid is polymerized, the more valuable the invention as applied to it.

The direct esterification reaction can be carried out in any conventional fashion, but it is preferred to proceed as taught in the companion application of William J. Radak and Richard E. Wolf, Ser. No. 488,097, filed July 12, 1974, in which the esterification reaction is carried out in aliphatic hydrocarbon medium, this reaction being illustrated hereinafter.

Any epoxide may be used since it is the mere presence of added oxirane functionality which serves to tie up the unreacted unsaturated acid by a low temperature addition reaction which can take place without inducing gelation. Thus, monoepoxides, such as propylene oxide, butylene oxide, or higher olefin oxide, can be used. Cyclohexene oxide will further illustrate the class.

Polyepoxides of any functionality and molecular weight may be used. The bisphenol-based diglycidyl ethers are all useful as are tri- and higher functional epoxides. The only limitation is innocuous compatibility with the primary polyethylenic polyester.

The preference for esterification in aliphatic hydrocarbon medium has previously been expressed. Not only is such reaction generally faster and more economical, but, and from the standpoint of this invention, the reaction product contains a smaller proportion of unreacted acid. As will be evident, the less unreacted acid, the more applicable and useful is this invention. Thus, in preferred practice, the mixture of polyethylenic polyester and unreacted acid should have an acid value of less than 150, more preferably less than 100. After reaction with the epoxide, the acid value is greatly reduced, preferably below 10 where it is not troublesome.

The epoxide is added in an amount to reduce the acid content to the desired level, e.g., a stoichiometric amount adequate to consume substantially all of the acid. Excess oxirane functionality is not desired, so any stoichiometric excess is minimized and the reaction with oxirane is continued to substantial completion.

An alkaline catalyst is desirably added to facilitate the carboxyl-oxirane reaction (which produces an hydroxy ester) and solvent and catalyst are stripped off by distillation under vacuum following completion of the reaction. The reaction goes easily by simple heating in the liquid phase at a temperature insufficient to cause rapid direct esterification, usually below about 100°C.

From the standpoint of modifying the properties of the polyethylenic polyester, this depends on the inadequacy of the polyester. In some instances, the polyester is excessively viscous, in which case the epoxy ester can be selected to reduce viscosity. Propylene oxide or butylene oxide are helpful here. Ethylene oxide can also be used if pressure is available for the reaction.

The polyethylenic polyesters based on polyhydric alcohols containing at least three hydroxy groups are especially useful in radiation (ultraviolet preferred) curing systems where they cure rapidly to provide hard films with the polyester constituting the bulk of the coating (more than 50% by weight). In these instances, it is frequently desired to increase viscosity for coating utility and to enhance the physical toughness of the film. Polyglycidyl ethers of aromatic polyhydric compounds are desirable here, for reaction with the available acrylic acid or other acid. The preferred ethers are diglycidyl ethers of bisphenols, such as biphenol A. The diglycidyl ethers which are particularly preferred are those having a molecular weight below about 1000, more preferably below 450. Commercial products applicable here are illustrated by Epon 828 (Shell) and Araldite 6010 (Ciba-Geigy).

When the polyethylenic polyester contains on the average of 2.4 or more ethylenic groups per molecule, then coatings containing 50% or more of the polyester cure on radiation exposure to provide coatings which are somewhat brittle. It has been found that the flexibility of the cured coatings is enhanced when diglycidyl ethers of polyoxyalkylene glycols are used to consume the excess unreacted acid, e.g., the acrylic acid. These have the formula:

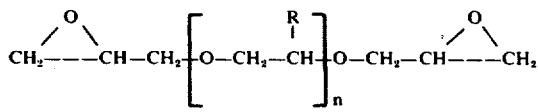

where R is selected from hydrogen, methyl and ethyl, and $n$ is a number of from about 2–30, preferably 4–20. It will be understood that $n$ identifies the nonterminal recurring groups.

Polyoxypropylene glycols (in which R is methyl) are particularly preferred. Dow products DER 732 and DER 736 will illustrate commercial products available in this category.

While flexibility is enhanced, these polyepoxides do not usually alter the product viscosity to any great extent.

Particularly where the polyethylenic polyester is based on a dihydric alcohol, and again used in a radiation curing system to constitute more than 50% by weight of the same, the epoxide can be selected to increase viscosity and enhance the hardness of the cured coatings. Here, epoxidized novolacs, e.g., polyglycidyl ethers of phenol-formaldehyde novolacs having an epoxy functionality higher than 2, e.g., from 2.5–10, preferably 3–6, can be used to consume the excess acrylic acid. These have the formula:

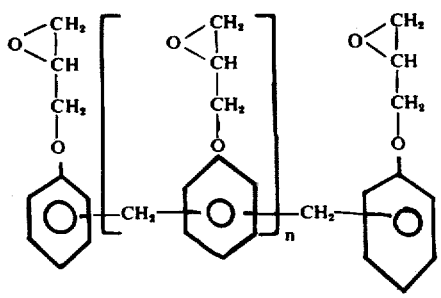

where $n$ is a number which equals the functionality noted hereinbefore, minus 2.

The invention is illustrated by the following examples.

EXAMPLE 1

Trimethylol Propane Triacrylate Direct Esterification

Charge Composition (grams)
| | | |
|---|---|---|
| 1. | Trimethylol propane | 670 |
| 2. | Acrylic acid | 1235 |
| 3. | Methyl cyclohexane | 635 |
| 4. | p-methoxy phenol | 0.75 |
| 5. | $H_2SO_4$ | 6.35 |
| 6. | Dow DER 736 | 467.5 |
| 7. | Pyridine | 27.7 |

Reagents 1 through 4 were charged in 5 liter flask equipped with mechanical stirrer, Dean-Stark water separator, thermometer and air sparge. The mixture was heated to 40°C. until the trimethylol propane had dissolved. The $H_2SO_4$ catalyst was then introduced and the heating continued for approximately 17 hours until the azeotrope showed no water present, and the acid value had been reduced to 60.

Reagents 6 and 7 were then charged and the heating continued until the acid value fell below 5.

A vacuum distillation was performed to remove both solvent and pyridine catalyst.

EXAMPLE 2

Pentaerythritol Triacrylate

Charge Composition (grams)
| | | |
|---|---|---|
| 1. | Pentaerythritol | 217.6 |
| 2. | Glacial acrylic acid | 391.6 |
| 3. | Methyl cyclohexane | 203.1 |
| 4. | p-methoxy phenol | 0.24 |
| 5. | $H_2SO_4$ | 2.03 |
| 6. | Araldite 6010 | 48.4 |
| 7. | Triethyl amine | 7.6 |
| 8. | Sodium oleate | 1.9 |

Reagents 1 through 4 were charged in a one-liter flask equipped as described in Example 1. the mixture was heated to 40°C. at which time the $H_2SO_4$ catalyst was added. Water was azeotropically removed at 85–95°C. until an acid value of 20 was reached.

Reagents 6, 7 and 8 were charged and the heating continued until an acid value of less than 5 was obtained.

A vacuum distillation was then performed as described in Example 1.

The invention is defined in the claims which follow. We claim:

1. A method of producing a polyethylenic polyester substantially free of unreacted acid by direct esterification comprising directly esterifying an esterifiable aliphatic polyhydric alcohol with excess polymerizable monoethylenic monocarboxylic acid to produce a mixture of polyethylenic polyester and unreacted acid, and then adding an approximately stoichiometric proportion of epoxide to said mixture and maintaining said mixture at a temperature to cause said epoxide to adduct with said unreacted acid to thereby form a mixture of said polyethylenic polyester and epoxy ester.

2. A method as recited in claim 1 in which the acid value at the time of addition of said epoxide is less than 100 and the final product containing the epoxy ester has an acid value of less than 10.

3. A method as recited in claim 2 in which said polyhydric alcohol contains at least three hydroxy groups per molecule and it is reacted with acrylic acid to esterify at least two of said hydroxy groups with said acrylic acid.

4. A method as recited in claim 3 in which said epoxide is a polyepoxide.

5. A method as recited in claim 1 in which said polyhydric alcohol contains at least three hydroxy groups per molecule, and said polyepoxide is a diglycidyl ether of a bisphenol having a molecular weight below about 1000.

6. A method as recited in claim 1 in which said polyethylenic polyester contains at least 2.4 ethylenic groups per molecule, and said polyepoxide has the formula:

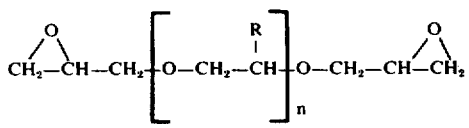

where R is hydrogen, methyl or ethyl, and $n$ is a number from about 2–30.

7. A method as recited in claim 6 in which said polyepoxide is a diglycidyl ether of a polyoxypropylene glycol in which $n$ is from 4–20.

8. A method as recited in claim 1 in which said polyhydric alcohol contains two hydroxy groups per molecule, and said polyepoxide is an epoxidized novolac having an epoxy functionality from 2.5–10.

9. A method as recited in claim 8 in which said epoxidized novolac is a polyglycidyl ether of a phenolformaldehyde novolac having the formula:

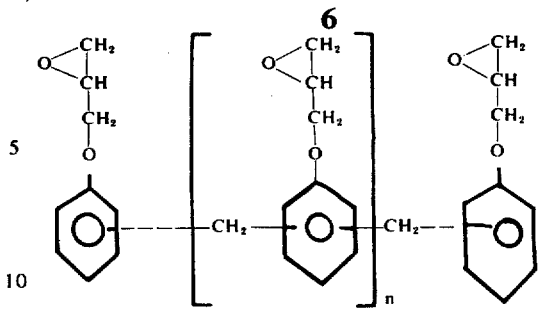

in which $n$ is from 1–4, and said acid is acrylic acid.

10. A method of producing a polyethylenic polyester substantially free of unreacted acid by direct esterification comprising directly esterifying an esterifiable aliphatic polyhydric alcohol having 3 or 4 hydroxy groups with at least 2 mols of acrylic acid per mol of polyhydric alcohol to produce a mixture of polyethylenic polyester and unreacted acid having an acid value of less than 150 and then adding an approximately stoichiometric proportion of polyepoxide to said mixture and maintaining said mixture at a temperature of up to about 100°C. in the presence of an alkaline catalyst until the epoxy functionality has been substantially completely consumed to thereby remove most of the unreacted acid as epoxy ester and provide a mixture of said polyethylenic polyester and epoxy ester.

11. A method as recited in claim 10 in which said polyepoxide is a diglycidyl ether of a bisphenol having a molecular weight below 450.

12. A method as recited in claim 10 in which said polyethylenic polyester contains at least 2.4 ethylenic groups per molecule and said polyepoxide is a diglycidyl ether of a polyoxypropylene glycol having from 4–20 nonterminal recurring groups.

* * * * *